United States Patent [19]

Talbot

[11] 4,175,833
[45] Nov. 27, 1979

[54] ELECTRICALLY CONTROLLABLE OUTER REARVIEW MIRROR FOR VEHICLES

[76] Inventor: Yorck Talbot, Ebersstr. 80, D-1000 Berlin 62, Fed. Rep. of Germany

[21] Appl. No.: 823,525

[22] Filed: Aug. 9, 1977

[30] Foreign Application Priority Data

Aug. 18, 1976 [DE] Fed. Rep. of Germany ....... 2637555

[51] Int. Cl.$^2$ ............................................... G02B 5/08
[52] U.S. Cl. .................................................... 350/289
[58] Field of Search ................... 350/289, 97, 279–280, 350/282; 248/479; 74/501 M; 404/12–14; 301/37 J; D10/111; 204/19

[56] References Cited

U.S. PATENT DOCUMENTS

| | | | |
|---|---|---|---|
| 3,788,734 | 1/1974 | McDuffee | 350/289 |
| 3,811,755 | 5/1974 | Carson | 350/289 |
| 4,050,776 | 9/1977 | Hsu | 350/289 |
| 4,076,392 | 2/1978 | Suzuki et al. | 350/289 |

Primary Examiner—John K. Corbin
Assistant Examiner—B. W. de los Reyes
Attorney, Agent, or Firm—Michael J. Striker

[57] ABSTRACT

The electrically driven remotely controllable rearview mirror comprises a mirror housing adapted for being mounted at one end to the vehicle and having its other end open, an inset bracket inserted into the housing through the open end and fitting the inner wall of the housing, an electrically controllable mirror assembly including a mounting flange disconnectably fastened to the bracket; and means for detachably connecting the bracket to the housing.

16 Claims, 5 Drawing Figures

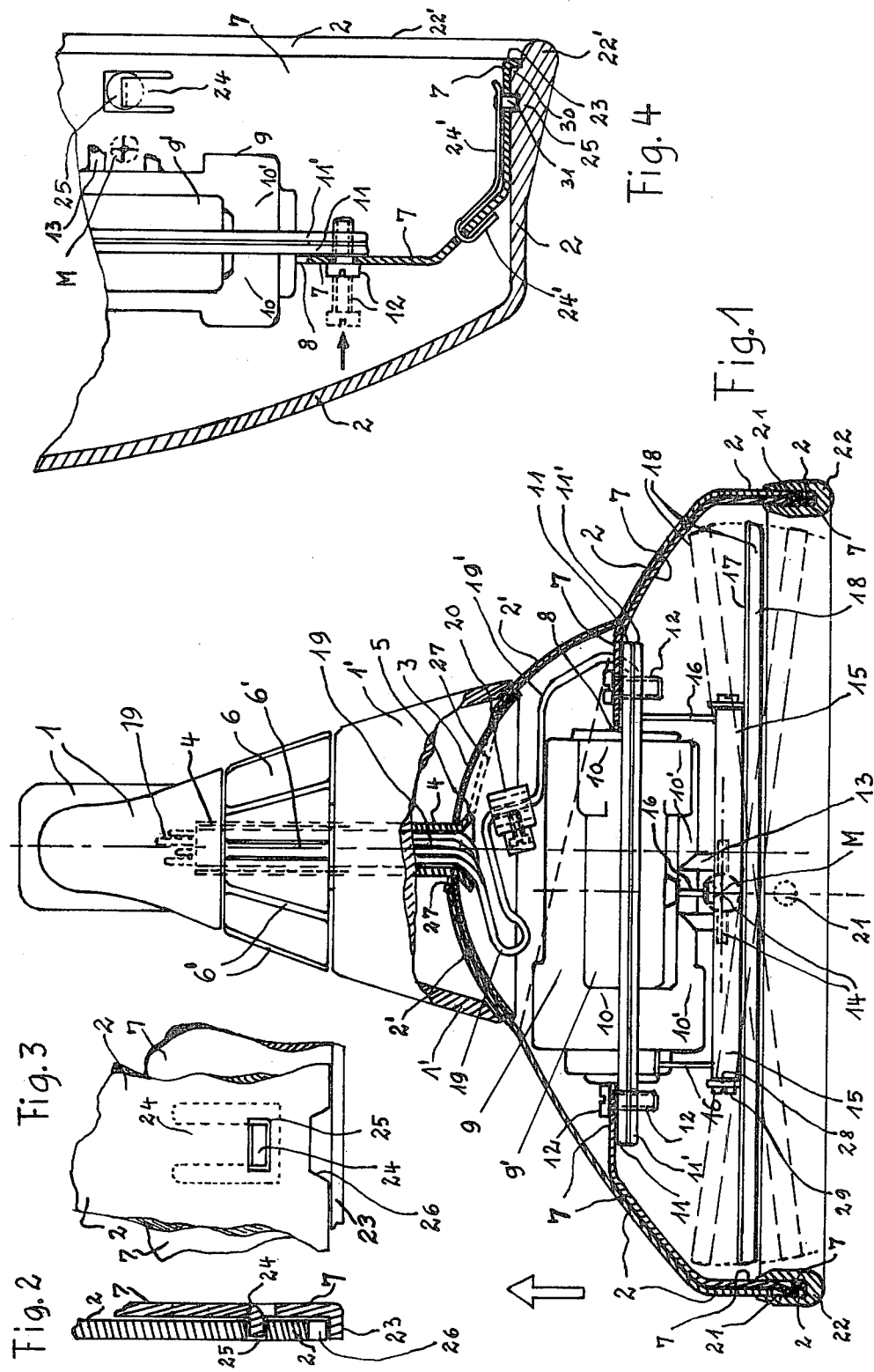

ELECTRICALLY CONTROLLABLE OUTER REARVIEW MIRROR FOR VEHICLES

BACKGROUND OF THE INVENTION

This invention relates to an outer rearsight mirror for vehicles being settable in position by distant electrical control and including a rearwardly opened housing carried by a footing support, in which housing a driving aggregate is built-in controlled by means of cables and a switch at a distance from the interior of the vehicle, whereto a mirror glass carrier is articulately associated that is settable about the horizontal axis upwardly and downwardly and about the vertical axis inwardly and outwardly.

Generally stated, the known distantly operable outer rearsight mirrors are provided with an electrical driving aggregate in the form of a pole-reversible motor, with a transmission forward and rearward run gearing, and with a pulling magnet carrying out the run change by axially shifting the motor pinion. The motor, gearing, magnet and cable connections are closed within a casing made of a plastic material, composed of a pair of half-shells with circumscribing flanges unitary with this casing. This unit lies on a plurality of threaded eyelets projecting from the bottom of a hollow cast or injection molded casing for the mirror upon which eyelets this unit is attached by means of screws that are tightened by screw-drivers introducible into the housing opening. From the half-shells facing the housing opening, there centrally extends a support as a bearing for a universal joint. Upon this joint, a generally rectangular frame is pivotally located having mutually crossing spokes and being limitedly swingable about the horizontal axis and about the vertical axis crossing the same. This swinging is effected by pulling elements, such as for instance cords or long screws projecting from the same half-shell and operating on plural points lying outside the crossing on the axes thereof and accomplishing the shifts of the frame to the momentaneously selected one of the four possible directions. In the course of the finishing mounting of the entire rearsight mirror, by means of the so-called "blind rivets", there is affixed to this frame from the outer side inseparably an additional thin plate and to this plate the mirrorglass is then attached by means of a plastic foil self-sticking on either side thereof and serving at the same time as a protection against splintering.

These known distantly actuable outer rearsight mirrors have shown to suffer from a considerable shortcoming, bothersome for a rational assemblage in a factory. This shortcoming lies in the circumstance that first the entire electrical driving aggregate, together with the frame it carries, ought to be affixed by screws from outside to the threaded eyelets projecting from the housing inner side. This operation must be preceded by application to this frame of said additional thin plate by means of blind rivets and by glueing onto this plate of the mirror glass.

This shortcoming of the known rearsight mirrors engenders another important drawback. After the plate has been riveted to the frame and in particular after the mirror glass has been glued to this plate, neither the electrical driving aggregate nor the fixing screws tying this aggregate to the housing are accessible from outside. Thus, for checking-up, repairing or exchanging in case of a defect the aggregate, the still good mirror glass must be stripped from the plate carrying it. This is connected with the absolute danger of its breaking. Then there are to be drilled out the connecting blind rivets fixing this plate to the swingable frame. All this means that, when in the case of the known mirrors one defect is to be remedied, this can be effected only with a considerable and purposeless time loss. This is thereby connected with costs and with the peril of damaging or even destructing the valuable mirror parts.

Yet, there is another inconvenience prejudicially affecting the known distantly operable outer rearsight mirrors, namely that they are not universally employable for both the left and the right side of the vehicle. The angle at which the mirror glass may be turned inside its housing in the four different directions is relatively small. Therefore, this housing, together with the footing support carrying the same, and/or this footing support itself, must be attached to the vehicle body in a manner such that this housing, in its normal and/or zero position, is turned at a correspondingly great initial angle inwardly in the direction toward the side window.

As a consequence hereof, the known outer rearsight mirrors require the manufacturing plant to spend a lot of money on instruments and on double warehousing, while wholesale enterprises have to store one specific mirror type or at least one by one specific housing or footing support for the left and the right side of the vehicle.

SUMMARY OF THE INVENTION

It is therefore the object of this invention to provide for vehicles an electrically distantly operable outer rearsight mirror avoiding the above mentioned shortcomings, drawbacks and/or inconvenients, while preserving all the advantages of the otherwise known mirrors.

According to the invention, this object is achieved in the way of providing an inset, being substantially of a vessel-like configuration and being kept demountably inside the housing by means of at least a pair of fixing pieces mutually gripping one into the other. This inset has an outside contour corresponding to the inner contour of said housing and supports on its bottom opened in a correspondigly broad aperture an electrical driving aggregate and/or its casing equipped with supporting surfaces in the form of flanges. This aggregate leans thereupon and/or is partially immersed therein. Said inset having the form of a vessel-like configured unit is kept separately in position by fixing pieces being operable from outside and/or from the rearside of the here mentioned inset.

Additional novel features of this outer rearsight mirror according to this invention are defined in dependent claims.

The accompanying drawing shows embodiments of the outer rearsight mirror according to this invention.

BRIEF DESCRIPTION OF THE DRAWINGS

FIG. 1 illustrates a partially cross-sectioned plan view of the outer rearsight mirror prepared for being mounted onto the vehicle left side, the travelling direction being marked by arrow;

FIG. 2 depicts in a partially exploded and a little enlarged scale picture a detail of the fixing arrangement of the mirror of FIG. 1;

FIG. 3 shows the same detail turned by 90° and in a representation exploded on either side;

FIG. 4 displays in a cross-sectioned and on one side exploded plan view a variant of the outer rearsight mirror according to the invention.

DESCRIPTION OF THE PREFERRED EMBODIMENTS

Figure 5:
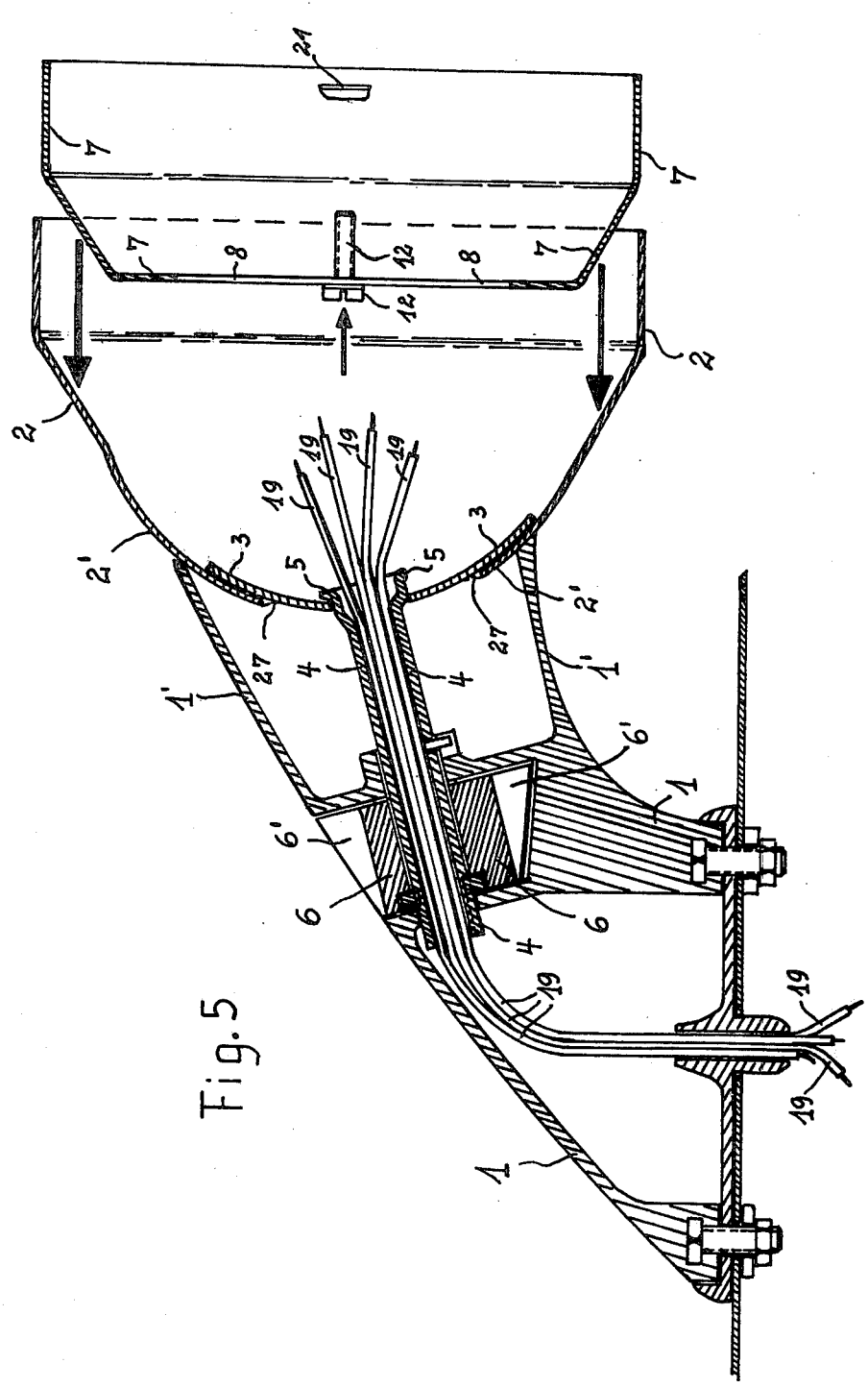
FIG. 5 illustrates in longitudinal cross-section and sideview an outer rearsight mirror of the invention, wherein it is visible before the back opening of the still empty housing an also still empty inset of the vessel-like configuration, which inset is shifted later on into the housing in the direction marked by arrows.

The outer rearsight mirror shown here in FIG. 1 and partially also in FIG. 5 as an embodiment of the invention consists in a housing deep-drawn for instance from a relatively thin metal sheet, provided with a spherical culotte member 2' continguously outwardly vaulted from the metal sheet and having positioned its base surface at a sharp angle obliquely to the opening border of the housing 2, which culotte member has an aperture 27 extending parallel to its base surface. The culotte member 2' comprises therein a centering culotte 3 with a therefrom running axially shiftable pulling element 4 having a nose-like head 5. Here, this pulling element 4 is not configured, as it has been usual, as a massive threaded rod, but in a novel mode as an element drilled through along its length, so that it forms at the same time a protecting tube for the electrical feeding cables 19 passed therethrough. These cables project from the bottom side of the footing support 1 and are connected to a distant control switch located in the interior of the vehicle.

The free end of this tubular pulling element 4 is provided with an exterior treading and projects into a nut member 6 as a fixation means for the settable mirror housing 2.

In the exemplary embodiment of the invention shown in FIGS. 1 and 5 illustrating this outer reasight mirror, this nut member 6 is turnably borne in an outwardly open cutout provided upwardly on the backside of the mirror footing support 1 conically rearwardly diverging to form a hollow hopper 1'. This nut member is appropriately adjusted to the conical form of the footing support 1 to such a degree that there are not generated either projections or stepped areas. In the nut member 6, deep axial grooves 6' are provided enabling engagement with a manually operable setting instrument, such as for instance a small coin, a screwdriver or the like.

The exemplary embodiment of the outer rearsight mirror displayed in FIG. 1 and FIG. 5 reveals an important novel feature residing in the fact that the metal sheet housing 2 being, as mentioned above, limitedly resettable to all sides and fixably bound to the footing support 1, includes installed therein an inset 7 being for instance also deep drawn from a relatively thin metal sheet and having substantially a vessel-like configuration. The outer contour of this inset corresponds to the inner contour of this housing 2, this inset being kept in position inside said housing 2 by means of at least a pair of mutually opposite and slightly projecting fixing pieces in a manner such that it may be withdrawn.

On the flat bottom of this inset 7 provided with a correspondingly broad aperture 8, there is affixed in an aproximately semi-immersed position the known and in the introduction hereto described electrical driving aggregate by means of at least a pair of screw-elements 12 being screwed-in from the back side through holes in the bottom of the inset 7 into threaded bores of the flanges 11 and 11' circumscribing all around and carrying the driving aggregate.

This known driving aggregate, having not been shown in FIG. 1 in a cross-sectional view, is a direct current motor is of changeable polarity and comprises associated thereto a forward and backward gearing 9 and a motor pinion with a switch-over magnet 9' axially shifting this pinion, all of which, together with the thereto coupled cable terminals 19' are closed in a plastic casing, formed from a pair of tightly mutually touching half-sheels 10 and 10' integral with the carrying flanges 11 and 11'. Centrally from the half-shell 10', a fork-like carrier 13 for a universal joint 14 projects whereupon, for instance, by means of four constantly springing pre-stressed pulling cords 16, a frame 15 is attached that is swingable about a pair of axes crossing one another in the motion central point M of the universal joint 14 in four different directions. To this frame 15, there is firmly attached a metal sheet base 17 upon which the mirror glass 18 is kept in position by a self-sticking foil adhesive on either side thereof.

The exemplary embodiment depicted by FIG. 1 makes easily comprehensible the important advantages of the outer rearsight mirror of this invention, in particular the advantages of the vessel-like formed inset 7, regarding the low price of production of the component parts, a simple large scale assemblage and sequential easy exchange of the component parts.

As has been usual, the housing 2, as well as the inset 7, may be made as thinly walled cast or injection molded parts. However, with a deal of more advantage, the same may be produced by means of relatively simple and therefore cheap drawing instruments from a light, firm and well galvanizable or paintable metal sheet, all that without any narrow tolerances.

The warehousing of the component parts in a factory and the assemblage can be rationalized in the way of dividing the entire outer rearsight mirror according to this invention for instance into two main construction groups:

One of the groups consists of the footing support 1,1', upon which there is affixed the still empty housing 2 by means of the centering calotte 3, the pulling element 4 and the grooved nut 6. Through the footing support 1,1' and the tubular pulling element 4, there are already drawn the feeding cables 19, which are stripped at their terminals of the insulation and extend in a sufficient length into the housing 2.

The other group is formed by the vessel-like formed inset 7 carrying affixed thereto on its bottom, in a novel manner, by means of screws 12, projecting from the back side of this inset 7, the complete driving aggregate, together with the frame 13, the metal sheet plate 17 and the thereto glued mirror glass 18. The de-insulated short cable terminals 19' project rearwardly from the inset 7 and carry either four individual cable clamps or one quadruple clamp 20.

From these exemplarily indicated main mounting groups, it is possible to assemble simply and quickly the complete outer rearsight mirror in the following operation:

Firstly, the cable terminals 19 projecting into the empty housing 2 are connected to the cable terminals 19' extending rearwardly from the inset 7 in the way of tightening the cable clamps 20 by means of a screwdriver that may be easily introduced into the still large free space between the housing 2 and the inset 7. There-after, the complete driving aggregate, together with the vessel-like formed inset 7 carrying the mirror glass are shifted so far into the opening of the housing 2 that the fixing pieces 21 catchedly latch in their end position. In FIG. 1, these fixing pieces are formed by small tongues 21 projecting outwardly from the walling of the inset 7 and are engaged with corresponding cutouts or windows provided in the opening border of the housing 2.

Finally, an edge protecting profile 22 of self-sticking character is set circumferentially over the opening borders of the housing 2 and the inset 7 lying closely on one another. This profile then also covers the fixing pieces 21 and makes them invisible.

The thus assembled outer rearsight mirror according to this invention may be later on again dismounted in the equally easy way. When this is being done, the edge protecting profile 22 is pulled away, the fixing pieces 21 are dislocked, for instance, by means of a knife inserted between the opening borders of the housing and the inset 7, the inset 7 is withdrawn from the housing, together with the aggregate and the mirror glass 18 and the cable terminals are disconnected on the cable clamps 20. After the screws 12 have been set aside and the cable terminals 19' have been withdrawn from the bottom of the inset 7, the entire aggregate can be lifted from the inset 7, or it may be dismantled and the possibly defective parts can be exchanged or repaired.

Such a possibility has not been existing hitherto. Being so, the valuable electrical aggregate, together with the metal sheet plate 17 and the mirror glass, may be easily built out if any need has arisen to make a repair thereof. Thereby, to the difference from the mirrors having been known hitherto, there is no need for a forcible detachment of the component parts, that obstruct there access from outside to the fixing screws of the aggregate lying deep inside the housing. This is another considerable advantage brought in by the outer rearsight mirror according to this invention.

For enabling a simple and cheap exchange of the mirror glass 18, being, as the experience shows, a damage-prone component part, the invention proposes, as FIG. 1 shows, to assemble to a coherent unit the mirror glass 18, the metal sheet plate 17 and the self-sticking connecting foil, binding said glass and plate together, all being separably attached to the frame 15, for instance, by means of at least two bored tongues 28 bowed out from the metal sheet plate 15 and of screws 29. The screws 29, as well as the corresponding threaded holes in the frame 15, can be shunned, when there are provided four or more tongues 28, sized so long and/or so far bent out that they may be curved around the outer border on the four rectangular sides of the frame 15 by means of a pair of pliers. Another possibility is to have the tongues 28 initially bent and adapted to be springing, so that they respond to a pressure onto the mirror glass 18 exerted in the backward direction by embracing the outer borded of the frame 15 or slide and lock in cutouts provided in this outer border. Such a springing formation of the tongues 28 will provide an additional advantage, namely that the unit builtup from the mirror glass 18, the adhesive foil and the metal sheet plate 17, will be exchangeable from outside without any need for pulling out from the housing 2 the vessel-like formed inset 7, together with the aggregate and the like. From the standpoint of security, such a springing latching connection is unobjectionable, since the mirror glass 18, inside the housing 2, is not exposed to any pulling forces, while being affected by pressure forces only.

As an alternative detail, FIGS. 2 and 3 display a fixing arrangement securing the vessel-like formed inset 7 inside the housing 2. This arrangement is formed by a springing tongue 24, unitarily stamped from the wall of the inset 7 and being shortly bent to the outside. This tongue is snapped into a cutout 25 provided in the wall of the housing 2. The inset 7 has here a narrow bordering rim 23 bowed out to the outside that, in coaction with the fixing means 24,25, prevents the inset 7 from being shifted inwardly further into the housing 2. This bordering rim 23 ensures besides the possibility of inserting for instance a screwdriver under a notching 26 provided in the housing border and by its turning to withdraw the inset 7 from the housing 2. Therefore, by means of a stick, the springing tongue 24 has had to be pressed off the cutout in the housing border, so that in this way the fixing arrangement 24,25 has become disengaged.

The invention envisages another possibility of easing the withdrawal of the inset 7 from the housing 2, namely to configure the housing 2 and the inset 7 on their borders lightly conically enlarged to the outside, which does not alter anything in the described function of the fixing mebers 21,24,25 and of the bordering rim 23.

In a partially cross-sectional and exploded view, FIG. 4 shows a variant of the outer rearsight mirror according to the invention. Here the question is of a construction that is not universal and attachable to each vehicle and to its either left or right side, as the case is in regard to the mirror of FIGS. 1 and 5. The outer rearsight mirror of FIG. 4 is adapted to be mounted in particularly large series on vehicle bodies of certain uniform types or on several types of vehicle bodies of similar body shape. Here, a number of component parts is spared:

The electrical aggregate is here represented, for the sake of simplification, only with its motor 9, the gearing switching magnet 9', the casing 10,10' and the carrying flanges 11,11', i.e. without the mirror glass 18 and the like. This aggregate otherwise corresponds to the driving aggregate of the outer rearsight mirror according to FIG. 1. Here, the housing is configured as a sufficiently deep cast or injection molded part and is carried, in the manner usual in the case of large series mirrors of this kind, by a footing support that is cast on or attached to its bottom side in a location far offset from its center, this phenomenon however is not visible in the plan view drawing of FIG. 4. In the per-se known manner, the opening border of the housing 2 is progressively so thickened that there is created a protective border 22' which is preventive of cutting bursts and is lightly rounded. Deep inside the housing 2, this protecting border is shaped with a stepping-off joining border 30 for abutment of the bordering rim 23 of the inset 7.

Also in this embodiment, there is a vessel-like formed inset 7 made for instance by deep drawing from a relatively thin metal sheet and playing the role of a carrier for the complete driving aggregate 9,10,11,15,17 that is already provided with the mirror glass 18 and is affixed to the bottom of the inset 7 in the already described manner from the back side thereof (arrows in FIG. 4) by means of screws 12. The inset 7 carrying the complete aggregate is shifted inwardly into the opening of the housing 2 so far that its bordering rim 23 abuts the narrows inner border 30 of the housing 2 and that the fixing members snappingly engage one another. These fixing members may be formed in this embodiment for instance by independently produced leaf springs 24' curved inside said inset 7 and a short stud 31, engaged in a flat chamber or bore 25 provided on the inner side of the housing 2. The terminal of the leaf spring 24' extending beyond this stud 31 may be slightly angularly bent for enabling a knife to lift easily the stud 31 from the chamber 25. By means of a metal wire hook gripping behind the stud 31, the inset 7 can be more easily withdrawn from the housing, since thus the stud 31 can no more come in engagement.

The at least one fixing means arranged on the back side of the housing 2 for securing the inset 7 inside this housing 2, as is visible from the representation in the upper region of FIG. 4, also can be formed as an angular springing tongue 24, engageable with a for instance long cutout 25 provided in the bottom wall of the housing 2. This cutout then also is serviceable as rain water outflow bore.

It is worthwhile to make here an entirely general mention, namely that the fixing means securing the inset 7 inside the housing 2 have not necessarily to be made springingly snapping. For the fixing stud 31 present for instance in the case of the rearsight outer mirror of FIG. 4 (bottom right), with the same degree of efficiency in function, there may be substituted a short fixing screw 31' having a flat grooved head that is engaged via a passage hole in the wall of the inset 7 in a threaded chamber 25 of the housing 2. This saves the leaf spring 24 or said springing tongue. Where this fixing screw 31' is not very far spaced from the housing border, the mirror glass 18 of the completely assembled outer rearsight mirror can be manually turned so far inwardly into the housing that it will be easy to reach this fixing screw 31' from outside with a screwdriver. Where the space conditions appear to be particularly narrow, this fixing screw may be configured as a grooved head-less screw 31'.

In the manufacture of the outer rearside mirrors according to this invention, another rationalization provision taken may be the production of the shell 10 of the casing of the driving aggregate lying on its flange 11 upon the bottom of the vessel-like formed inset 7 unitarily with this entire inset 7 as a one-piece member, being cast, injection molded or deep drawn, in which case it would be particularly advantageous an injection molded plastic part, because of its good electrical insulating properties.

Otherwise, it is assumed to fall within the framework of this invention to combine one or another exemplarily shown element of FIG. 1 or FIG. 2 and FIG. 3 of the particularly advantageous features of the construction of the outer rearsight mirror of this invention with one or another particularly advantageous feature of the outer rearsight mirror shown in FIG. 2. In this sense, there may be employed for instance in the alternative in the function of the fixing means for the outer rearsight mirror according to FIG. 4 the there proposed short screw and/or grooved head-less screw 31' with a good result and the same functional efficiency also for securing the inset 7 in the housing of the outer rearsight mirror illustrated in FIG. 1. As a matter of another example, the cast or injection molded thickened rounded border 22' of the housing 2 as shown in FIG. 4 may be abstained from and the same may be replaced by the self clamping edge protecting profile 22 embracing the borders of the housing 2 and the inset 7 lying upon one another, and the like.

Finally, the vessel-like configuration of the inset 7 of the outer rearsight mirror according to this invention provides particular advantages for the rationalization of the production, mounting and dismantling operations, which do not exist in regard only to the distantly operable electrical driving aggregate of the construction nature demonstrated by FIGS. 1 and 4, but also equivalent advantages are achieved in respect to other known, also compact driving aggregates of electrical motoring, as well as electromagnetical construction, nature, that are apt to be affixed on some carrying base surfaces or flanges upon the bottom of the vessel-like formed inset 7 in a separable mode by means of screws 12.

What is claimed as new and desired to be protected by letters Patent is set forth in the appended claims.

1. In a remotely controlled, electrically operable outer rearview mirror for a vehicle, a combination comprising a cut-shaped housing having one end open; a mounting support connected to the other end of said housing to fix the latter to the vehicle; a removable cup-shaped insert matching an inner wall portion of said housing and defining an open side coinciding with the open end of said housing; a mirror assembly including an angularly adjustable mirror carrier for supporting a mirror and electrically controllable driving means for said carrier; means for connecting said mirror assembly to said insert; and fastening means for detachably connecting said insert together with said mirror assembly to said housing.

2. The combination as defined in claim 1, wherein said cup-shaped inset defines at its bottom wall an opening, said mirror assembly having a flange abutting against the bottom wall portion around said opening and being secured thereto by additional fastening means.

3. The combination as defined in claim 2, wherein the rim of said open side of said cut-shaped inset is provided with an annular flange abutting against a corresponding precess in the inner wall of said housing.

4. The combination as defined in claim 3, wherein the rim of said open end of said housing has a rounded, slightly outwardly bulged shape, the inner wall of said rim having recesses adapted to engage said detachable fastening means.

5. The combination as defined in claim 1, wherein said detachable fastening means for said inset includes recesses in said inner wall portion of said housing, and resilient tongues provided on said inset and engaging said recesses.

6. The combination as defined in claim 5, wherein said tongues are punched in the wall of said inset.

7. The combination as defined in claim 6, wherein said resilient tongues project from the rim of said insert and engage a corresponding cutout in the marginal area of the inner wall of the housing.

8. The combination as defined in claim 5, wherein said detachable fastening means for said inset includes elongated resilient elements each secured at one end thereof to the wall of said inset and having at its free end a pin projecting through a corresponding hole in the wall of said inset and engaging a recess in the wall of said housing.

9. The combination as defined in claim 1, wherein said detachable fastening means are screws passing through a hole in said inset and engaging a threaded hole in the inner wall of said housing.

10. The combination as defined in claim 1, wherein the edges of open sides of said housing and of said cup-shaped inset are in register with one another and a profiled protective element covering said edges.

11. The combination as defined in claim 10, wherein said protective element covers the detachable fastening means for said insert.

12. The combination as defined in claim 11, wherein said detachable fastening means include extensions projecting into the housing for securing said profiled protective element against slipping.

13. The combination as defined in claim 1, wherein said housing and said inset are provided with at least one operation point arranged for withdrawing said inset from said housing.

14. The combination as defined in claim 1, wherein said mirror assembly includes a casing for enclosing said remotely controlled electrical driving means, said casing being assembled of two half-shells, one of said half-shells being formed integrally with said inset.

15. The combination as defined in claim 1, wherein said mirror assembly includes a hinge joint controllably coupling said mirror carrier to said remotely controlled driving means to adjust the angular position of said mirror about a pivot point, said housing defining a front part shaped symmetrically about said pivot point and a colotte-shaped rear part obliquely arranged relative to a plane of symmetry passing through said pivot point, said rear part being adjustably attached to said mounting support for said housing, said support including linkage for coarsely adjusting the position of said housing together with the mirror assembly relative to the support and feeding cables for the driving unit of said mirror assembly.

16. The combination as defined in claim 15, wherein said colotte-shaped rear portion of said housing includes additional concave projection for accommodating extension feeding cable and plug and sockets for said cable to facilitate the installation of said mirror at the side of the vehicle remote from the operator.

* * * * *